US010193432B2

(12) United States Patent
Maksimainen et al.

(10) Patent No.: US 10,193,432 B2
(45) Date of Patent: Jan. 29, 2019

(54) METHOD FOR DATA TRANSFER OF ELECTRIC DEVICE CONFIGURATION, AND ELECTRIC DEVICE CONFIGURATION

(71) Applicant: ABB Technology OY, Helsinki (FI)

(72) Inventors: Petri Maksimainen, Helsinki (FI); Matti Veijanen, Espoo (FI); Jussi Rantanen, Helsinki (FI)

(73) Assignee: ABB Technology Oy, Helsinki (FI)

( * ) Notice: Subject to any disclaimer, the term of this patent is extended or adjusted under 35 U.S.C. 154(b) by 120 days.

(21) Appl. No.: 15/279,020

(22) Filed: Sep. 28, 2016

(65) Prior Publication Data

US 2017/0093268 A1 Mar. 30, 2017

(30) Foreign Application Priority Data

Sep. 29, 2015 (FI) ...................................... 20155688

(51) Int. Cl.
  *H02J 3/38* (2006.01)
  *H02M 1/00* (2006.01)
  *H02J 13/00* (2006.01)

(52) U.S. Cl.
  CPC .............. *H02M 1/00* (2013.01); *H02J 3/383* (2013.01); *H02J 13/0003* (2013.01);
  (Continued)

(58) Field of Classification Search
  USPC ........................................................ 307/24
  See application file for complete search history.

(56) References Cited

U.S. PATENT DOCUMENTS

2013/0003425 A1 1/2013 Lee et al.
2013/0134782 A1 5/2013 Seon
(Continued)

FOREIGN PATENT DOCUMENTS

EP       2814131 A2   12/2014
WO    2008144540 A1   11/2008

OTHER PUBLICATIONS

Finnish Patent Office, Search Report issued in corresponding Application No. 20155688, dated Mar. 23, 2016, 2 pp.

*Primary Examiner* — Rexford Barnie
*Assistant Examiner* — Xuan Ly
(74) *Attorney, Agent, or Firm* — J. Bruce Schelkopf; Taft Stettinius & Hollister LLP

(57) ABSTRACT

A method for data transfer of an electric device configuration, the electric device configuration comprising a plurality of converter devices including a first converter device and a second converter device, each of the converter devices comprising a first converter unit having a first power connection and a second power connection, the first power connection arranged to supply direct current power to the first converter unit and the second power connection arranged to supply electric power from the first converter unit, and the first power connections of the first converter units being electrically connected to one another. The method comprises transmitting information by the first converter device by causing changes in the voltage of the first power connection of the first converter unit of the first converter device, and receiving information by the second converter device based on identifying the changes in the voltage of the first power connection of the first converter unit of the second converter device.

10 Claims, 2 Drawing Sheets

(52) U.S. Cl.
CPC ............... *H02M 2001/008* (2013.01); *H02M 2001/0025* (2013.01); *Y02E 10/563* (2013.01); *Y02E 40/72* (2013.01); *Y04S 10/123* (2013.01)

(56) References Cited

U.S. PATENT DOCUMENTS

| | | |
|---|---|---|
| 2013/0181530 A1 | 7/2013 | Deboy et al. |
| 2013/0271056 A1* | 10/2013 | Bunte ............... F03D 7/0224 318/503 |
| 2013/0313909 A1 | 11/2013 | Storbeck et al. |
| 2015/0349583 A1* | 12/2015 | Yamada ............... G05F 1/67 307/46 |

* cited by examiner

METHOD FOR DATA TRANSFER OF ELECTRIC DEVICE CONFIGURATION, AND ELECTRIC DEVICE CONFIGURATION

BACKGROUND OF THE INVENTION

The invention relates to data transfer between devices of an electric device configuration.

A known electric device configuration comprises a plurality of converter devices, for instance frequency converters, whose direct voltage intermediate circuits are electrically connected to one another in order to enable power transmission between the converter devices. Many converter devices comprise a first converter device provided with a transmitter, and a second converter device provided with a receiver. The transmitter of the first converter device and the receiver of the second converter device are connected by a data transfer cable. The first converter device is arranged to transmit information by its transmitter to the receiver of the second converter device via the data transfer cable.

Such transmitters, receivers and data transfer cables increase the component costs and space requirement of the electric device configuration. Further, implementing the data transfer between the devices of the electric device configuration by transmitters, receivers and data transfer cables causes extra work in connection with commission and service.

BRIEF DESCRIPTION OF THE INVENTION

An object of the invention is to provide a method and an electric device configuration implementing the method so as to enable the aforementioned problems to be solved. The object of the invention is achieved by a method and an electric device configuration which are characterised by what is disclosed in the independent claims. Preferred embodiments of the invention are disclosed in the dependent claims.

The invention is based on implementing data transfer between converter devices of an electric device configuration by utilizing for the data transfer direct voltage connections of the converter devices, the direct voltage connections being electrically connected to one another in order to enable power transmission between the converter devices.

An advantage of the method and electric device configuration according to the invention is that no separate transmitters, receivers or data transfer cables are necessary for the data transfer between the converter devices. In some electric device configurations, the data transfer between the converter devices according to the invention may be implemented completely by software, without any physical component intended for data transfer exclusively.

BRIEF DESCRIPTION OF THE FIGURES

The invention is now described in closer detail in connection with preferred embodiments and with reference to the accompanying drawings, in which.

DETAILED DESCRIPTION OF THE INVENTION

Figure 1:
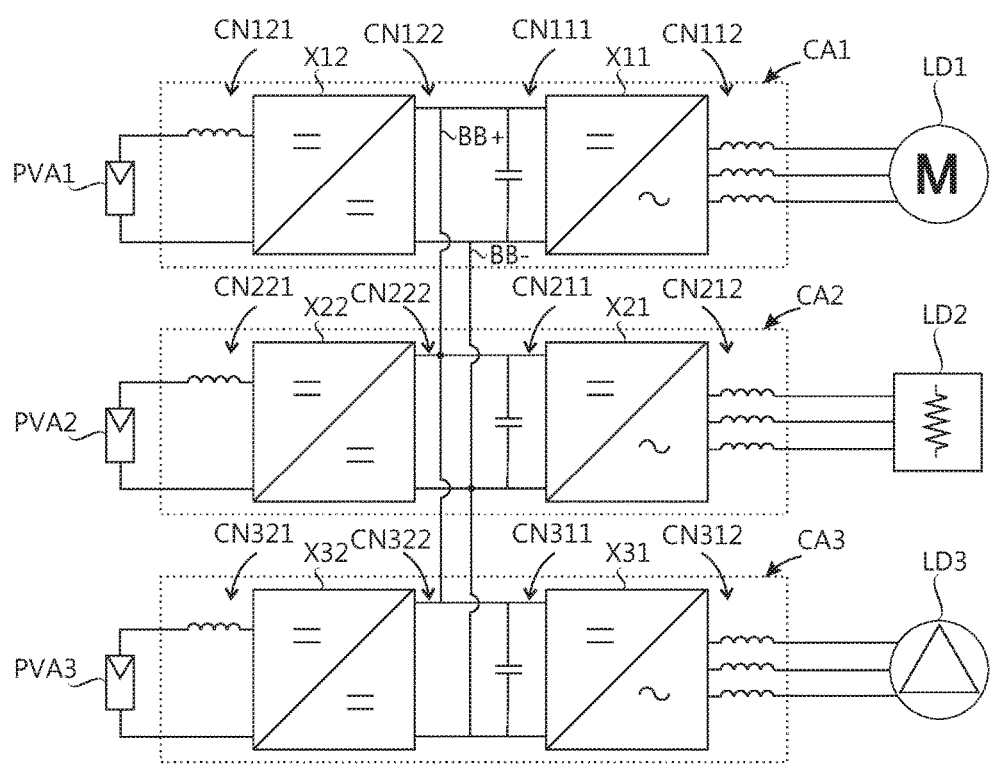
FIG. 1 shows an electric device configuration according to an embodiment of the invention.

FIG. 1 shows an electric device configuration according to an embodiment of the invention and comprising a first converter device CA1, a second converter device CA2, and a third converter device CA3. Each of the converter devices comprises a first converter unit and a second converter unit. The first converter device CA1 comprises a first converter unit X11 and a second converter unit X12. The second converter device CA2 comprises a first converter unit X21 and a second converter unit X22. The third converter device CA3 comprises a first converter unit X31 and a second converter unit X32.

Each first converter unit has a first power connection and a second power connection. The first converter unit X11 of the first converter device CA1 has a first power connection CN111 and a second power connection CN112. The first converter unit X21 of the second converter device CA2 has a first power connection CN211 and a second power connection CN212. The first converter unit X31 of the third converter device CA3 has a first power connection CN311 and a second power connection CN312. The first power connection of the first converter unit of each converter device is arranged to supply direct current power to the first converter unit, and the second power connection is arranged to supply electric power from the first converter unit. The first power connections CN111, CN211 and CN311 of the first converter units X11, X21 and X31 are electrically connected to one another through a direct voltage intermediate circuit, the direct voltage intermediate circuit comprising a first busbar BB+ and a second busbar BB−. The direct voltage intermediate circuit is arranged to enable power transmission between the converter devices.

The first converter device CA1 is arranged to transmit information via the first power connection CN111 of its first converter unit X11 by causing changes in the voltage of its first power connection CN111. Each of the other converter devices of the electric device configuration is arranged to receive information via the first power connection of its first converter unit based on identifying the changes in the voltage of the first power connection. Consequently, the second converter device CA2 is arranged to receive information via the first power connection CN211 of its first converter unit X21 based on identifying the changes in the voltage of the first power connection CN211. The second converter device CA2 comprises voltage measuring means arranged for identifying changes in the voltage of the first power connection CN211 of the first converter unit X21. No voltage measuring means are shown in FIG. 1.

In the electric device configuration according to the invention, the number of first converter units arranged to receive information may be higher or lower than or the same as that of first converter units arranged to transmit information. In an embodiment, only the first converter device of the electric device configuration is arranged to transmit information via the first power connection of its first converter unit, and only the second converter device of the electric device configuration is arranged to receive information via the first power connection of its first converter unit.

Each of the converter devices CA1, CA2 and CA3 comprises control means arranged to control the converter device in question. No control means are shown in FIG. 1. In a converter device arranged to transmit information, the control means are arranged to control the transmission of information. In a converter device arranged to receive information, the control means are arranged to control the processing of received information. In an embodiment, the second converter device is arranged to be controlled by information to be received via the first power connection of its first converter unit, in which case for instance the power, voltage and/or output frequency of the second converter device may be controlled by the information to be received via the first power connection.

The first converter device CA1 is arranged to cause changes in the voltage of the first power connection CN111 of its first converter unit X11 in order to supply information via the first power connection CN111 by controlling a load of the second power connection CN112 of the first converter unit X11. To the second power connection CN112 of the first converter unit X11 is coupled a load LD1. The first converter device CA1 is arranged to transmit information by controlling the power of the load LD1.

The first converter device CA1 is arranged to transmit information by causing in the voltage of the first power connection CN111 of its first converter unit X11 voltage changes of a predetermined type, such changes containing voltage rises and voltage drops. In alternative embodiments, the voltage changes of predetermined type contain voltage rises and/or voltage drops. Of properties of each voltage change of predetermined type, one or more of the following are predetermined: magnitude, duration, rate of change.

The first converter device CA1 is arranged to encode the information it transmitted such that a voltage rise of predetermined type corresponds to the bit "1", and a voltage drop of predetermined type corresponds to the bit "0". In an alternative embodiment, the voltage changes of predetermined type contain a plurality of voltage rises of different type and a plurality of voltage drops of different type. A voltage change of predetermined type may contain different information, depending for instance on the magnitude and duration of the voltage change. For example, a voltage rise of a first type and of a magnitude of 5 V and duration of 20 ms, may contain different information than a voltage rise of another type and of a magnitude of 10 V and duration of 30 ms.

In an embodiment, the first converter device is arranged to control a load coupled to the second power connection of its first converter unit directly, in which case the first converter device is arranged to control a load power controller. In another embodiment, the first converter device is arranged to control a load coupled to the second power connection of its first converter unit indirectly, in which case the first converter device is arranged to change the voltage of the second power connection of its first converter unit by changing the magnitude or frequency of the voltage, for instance.

The first converter unit X11 of the first converter device CA1 is an inverter unit whose second power connection CN112 is arranged to supply alternating electric power from the first converter unit X11. The first converter units X21 and X31 of the second converter device CA2 and the third converter device CA3 are also inverter units whose second power connections CN212 and CN312 are arranged to supply alternating electric power from the corresponding first converter unit.

The load LD1 of the first converter unit X11 of the first converter device CA1 is a three-phase motor. The load LD2 of the first converter unit X21 of the second converter device CA2 is a three-phase resistance. The load LD3 of the first converter unit X31 of the third converter device CA3 is a three-phase pump. The loads of the converter devices CA1, CA2 and CA3 are not connected to one another, i.e. every converter device CA1, CA2 and CA3 only supplies its own load.

Each second converter unit has a first power connection arranged to supply electric power to the second converter unit, and a second power connection arranged to supply electric power from the second converter unit and electrically connected to the first power connection of the first converter unit of the same converter device. The second converter unit X12 of the first converter device CA1 has a first power connection CN121 and a second power connection CN122. The second converter unit X22 of the second converter device CA2 has a first power connection CN221 and a second power connection CN222. The second converter unit X32 of the third converter device CA3 has a first power connection CN321 and a second power connection CN322.

Each of the second converter units X12, X22 and X32 is a direct current converter unit. To the first power connection of each of the converter units X12, X22 and X32 is coupled a solar cell configuration arranged to convert energy of light into direct current. To the first power connection CN121 of the converter unit X12 is coupled a solar cell configuration PVA1, to the first power connection CN221 of the converter unit X22 is coupled a solar cell configuration PVA2, and to the first power connection CN321 of the converter unit X32 is coupled a solar cell configuration PVA3.

Figure 2:
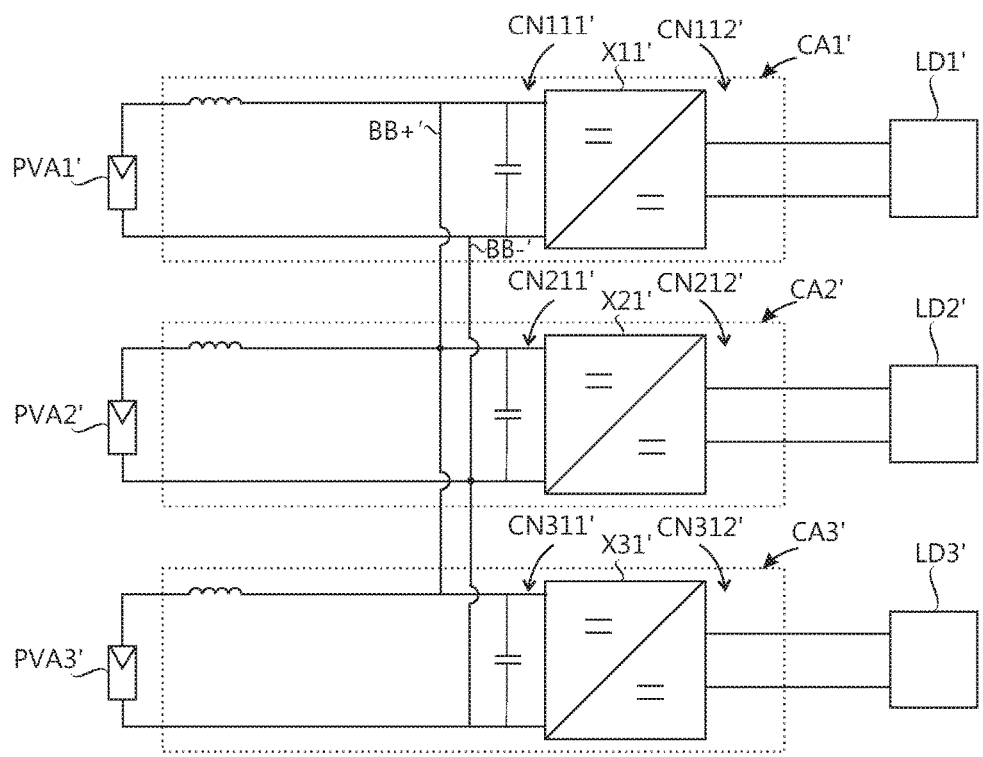
FIG. 2 shows an electric device configuration according to another embodiment of the invention.

FIG. 2 shows an electric device configuration according to an alternative embodiment of the invention and comprising a first converter device CA1', a second converter device CA2', and a third converter device CA3'. The electric device configuration according to FIG. 2 differs from the electric device configuration of FIG. 1 in two ways. First, each of the converter units only comprises a first converter unit, designated by references X11', X12' and X13'. Second, the first converter unit of each converter device is a direct current converter unit whose second power connection is arranged to supply direct current power from the first converter unit. The load coupled to the second power connection of each first converter unit is thus a direct voltage load. In other respects, the structure and operation of the electric device configuration of FIG. 2 corresponds to the electric device configuration of FIG. 1.

In each of the electric device configurations of FIGS. 1 and 2, the converter devices are supplied by solar cells. In alternative embodiments, the converter devices may also be supplied by power sources of another type, which may comprise alternating current sources and/or direct current sources. In an embodiment, the first converter device is a frequency converter device whose first converter unit is an inverter unit and second converter unit is a rectifier unit. In another embodiment, both the first converter unit and the second converter unit of the first converter device are direct current converter units.

In an embodiment, the components of the plurality of converter devices of the electric device configuration are mutually identical while differences exist in the programming of the control devices of the converter devices. In another embodiment, the plurality of converter devices of the electric device configuration are mutually completely identical, in which case each converter device is arranged to operate both as an information-transmitting first converter device and as an information-receiving second converter device.

The invention is most suitable to instances where the voltage of the first power connection of the first converter unit of the first converter device is relatively nonrigid. It is clear that if the voltage were very rigid, it would be more difficult to transmit information. For example, the rectified voltage of the main grid is a rigid voltage and, in a general case, to change it in order to transmit information is not sensible.

In embodiments wherein information is transmitted by controlling the load of the second power connection of the first converter unit of the first converter device, the load has to be suitable for controlling. Naturally, it is not reasonable to control a national grid in a manner according to the invention in order to transmit information. Many conveyors, too, are quite unsuitable for use as a load to be controlled in order to transmit information.

It will be apparent to a person skilled in the art that the basic idea of the invention may be implemented in many different ways. The invention and its embodiments are thus not restricted to the examples described above but may vary within the scope of the claims.

The invention claimed is:

1. A method for data transfer of an electric device configuration, the electric device configuration comprising a plurality of converter devices including a first converter device and a second converter device, each of the plurality of converter devices comprising a first converter unit having a first power connection and a second power connection, the first power connection being arranged to supply direct current power to the first converter unit and the second power connection being arranged to supply electric power from the first converter unit, and the first power connections of the first converter units being electrically connected to one another, wherein each of the plurality of converter devices comprises control means arranged to control the converter device in question, the method comprising the steps of:

transmitting information by the first converter device by causing changes in the voltage of the first power connection of the first converter unit of the first converter device, wherein the transmission of information is controlled by the control means of the first converter device, receiving information by the second converter device based on identifying the changes in the voltage of the first power connection of the first converter unit of the second converter device, wherein processing of the received information is controlled by the control means of the second converter device, and controlling the second converter device with control means thereof by information received via the first power connection of its first converter unit in order to control the power, voltage and/or output frequency of the second converter device by the information received via the first power connection.

2. A method as claimed in claim 1, wherein the method comprises the steps of:

supplying power to a load via the second power connection of the first converter unit of the first converter device, and controlling the power of the load in order to supply information to the first power connection of the first converter unit of the first converter device.

3. A method as claimed in claim 1, wherein information is transmitted by causing voltage changes of a predetermined type in the voltage, such changes containing voltage rises and/or voltage drops.

4. A method as claimed in claim 3, wherein of properties of each voltage changes of predetermined type is predetermined one or more of the following: magnitude, duration, rate of change.

5. An electric device configuration comprising:

a plurality of converter devices including a first converter device and a second converter device, each of the plurality of converter devices comprising a first converter unit having a first power connection and a second power connection, the first power connection being arranged to supply direct current power to the first converter unit and the second power connection being arranged to supply electric power from the first converter unit, the first power connections of the first converter units being electrically connected to one another, wherein the first converter device is arranged to transmit information via the first power connection of its first converter unit by causing changes in the voltage of the first power connection, and the second converter device is arranged to receive information via the first power connection of its first converter unit based on identifying the changes in the voltage of the first power connection, wherein each of the plurality of converter devices comprises control means arranged to control the converter device in question, in the first converter device the control means being arranged to control the transmission of information, in the second converter device the control means being arranged to control the processing of received information, and the second converter device being arranged to be controlled by information to be received via the first power connection of its first converter unit in order to control the power, voltage and/or output frequency of the second converter device by the information to be received via the first power connection.

6. An electric device configuration as claimed in claim 5, wherein the first converter device is arranged to cause changes in the voltage of the first power connection of its first converter unit in order to supply information via the first power connection by controlling a load of the second power connection of the first converter unit.

7. An electric device configuration as claimed in claim 5, wherein the first converter unit of the first converter device is an inverter unit whose second power connection is arranged to supply alternating current power from the first converter unit.

8. An electric device configuration as claimed in claim 5, wherein the first converter unit of the first converter device is a direct current converter unit whose second power connection is arranged to supply direct current power from the first converter unit.

9. An electric device configuration as claimed in claim 5, wherein the first converter device comprises a second converter unit provided with a first power connection arranged to supply electric power to the second converter unit; and a second power connection arranged to supply electric power from the second converter unit and electrically connected to the first power connection of the first converter unit.

10. An electric device configuration as claimed in claim 5, wherein as to their components, the plurality of converter devices are mutually identical.

* * * * *